United States Patent [19]
Posh

[11] Patent Number: 5,772,368
[45] Date of Patent: Jun. 30, 1998

[54] FULL-SIZE ROUTER TILT BASE

[76] Inventor: Ransom D. Posh, 31249 Six Mile Rd., Livonia, Mich. 48152

[21] Appl. No.: 425,184

[22] Filed: Apr. 19, 1995

[51] Int. Cl.$^6$ .................. B23C 3/12; B27C 5/10
[52] U.S. Cl. .................. 409/182; 144/136.95; 144/154.5
[58] Field of Search .................. 409/180, 182, 409/178, 174; 144/136.95, 1 F, 154.5

[56] References Cited

U.S. PATENT DOCUMENTS

| | | | |
|---|---|---|---|
| D. 337,501 | 7/1993 | Witt | D8/70 |
| D. 337,502 | 7/1993 | Witt | D8/70 |
| D. 338,213 | 8/1993 | Witt | D15/139 |
| D. 338,821 | 8/1993 | Witt | D8/71 |
| D. 351,774 | 10/1994 | Witt | D8/71 |
| 2,630,152 | 3/1953 | Turnbull | 144/136.95 |
| 2,702,569 | 2/1955 | Yelle | 144/136.95 |
| 3,601,004 | 8/1971 | Oshiro | 409/182 X |
| 3,853,160 | 12/1974 | Posey | 409/180 |
| 4,084,629 | 4/1978 | Kreusler | 144/154.5 |
| 4,290,464 | 9/1981 | Marsan | 409/182 |
| 4,312,391 | 1/1982 | Snow | 144/1 F |
| 4,454,898 | 6/1984 | Pavnica | 144/1 F |
| 4,572,715 | 2/1986 | Wolff | 409/180 |
| 4,655,653 | 4/1987 | Hall et al. | 409/182 |
| 4,674,548 | 6/1987 | Mills | 144/154.5 |
| 4,696,331 | 9/1987 | Irland | 409/182 |
| 4,742,856 | 5/1988 | Hehr | 409/182 X |
| 4,827,996 | 5/1989 | Cotton et al. | 144/134 |
| 4,844,135 | 7/1989 | Witt | 144/371 |
| 4,947,908 | 8/1990 | O'Banion et al. | 409/182 X |
| 4,977,938 | 12/1990 | Greeson | 409/182 X |
| 5,005,617 | 4/1991 | Michaels | 144/154.5 |
| 5,013,195 | 5/1991 | Strazar | 409/180 |
| 5,028,179 | 7/1991 | Grasset | 409/178 X |

FOREIGN PATENT DOCUMENTS

3537992  5/1987  Germany .................. 409/182

*Primary Examiner*—William R. Briggs
*Attorney, Agent, or Firm*—Gifford, Krass, Groh, Sprinkle, Patmore, Anderson & Citkowski

[57] ABSTRACT

A universal tilt base accommodates general-purpose router motor housings with diameters of 3-½ inches and larger. The motor housing is received by a collar tiltingly attached to a table base with an aperture, so that when a cutting bit attached to the router motor, the bit protrudes through the aperture to effect a workpiece, with means to independently adjust both the depth and tilt angle of the cutting bit. In the preferred embodiment, the collar is configured to accommodate router motor housings which either slide without rotation to adjust cutting depth and those which may be rotated during depth adjustment. To accommodate at least two of the types which do not rotate during depth adjustment, the collar is configured to receive motor housings having an at least one outward protrusion. A plurality of grooves, formed lengthwise and spaced apart on the inside cylindrical wall of the collar, may further be provided to accommodate motor housings having a plurality of spaced apart outward protrusions which slidably engage with the grooves. Means are also provided to compress a separation in the collar to secure the motor housing in position with a cutting bit attached thereto so as to bring about a desired cutting depth in the workpiece.

11 Claims, 6 Drawing Sheets

FULL-SIZE ROUTER TILT BASE

FIELD OF THE INVENTION

The present invention relates generally to power tools, and, more particularly, to hand-held routers. Even more particularly, this invention is directed toward a tilt base which accommodates general-purpose router motor housings supplied by various manufacturers.

BACKGROUND OF THE INVENTION

Routers are extremely versatile tools which may be used for a variety of applications, including contoured moldings, dovetail joints, and so forth. Full-size models, that is, those with motor housings of 3½ inches and greater, are typically supplied with a base and cylindrical collar perpendicular to the base, which enables the motor housing, also cylindrical, to be translated axially within the collar then locked into place for a desired vertical cutting depth.

Although one class of special-purpose routers, laminate trimmers, are optionally provided with bases facilitating the tilting of the motor axis with respect to the base, such tilt bases are not commercially available for larger, general-purpose routers for several reasons. First, it is only the advanced craftsman who might be in need of such versatility. More often than not, when faced with jobs requiring control over both bit depth and angle, these advanced users usually develop their own custom fixture or jig, enabling them to deploy a conventional router. In most cases, it set-up time is sufficiently shorter than the time consumed during use, such custom task-specific solutions to the problem are often justified.

Secondly, in the case of laminate trimmers, bit tilting is a more common requirement, again, for several reasons. First, laminate edges are often more attractive when beveled. Also, laminate-type bits are generally less sophisticated than general-purpose bits, and are often used only to create a flat surface. Furthermore, since laminate trimmers are only called upon to prepare edges, depth adjustment is more limited during such an edge-trimming process. Finally, again owing to the simplicity of the typical laminate bit and the smaller size of the machines involved tilting may be added without the need for additional or excessive safety features.

FIGS. 22–24 of U.S. Pat. No. 4,827,996 and the accompanying text describe a tilt base associated with a power tool for laminate trimming.

The need therefore remains for a tilt base capable of accepting different styles of full-size router motor housings, which would increase the applicability and versatility of the tool while facilitating depth and horizontal lateral adjustment of the cutting bit.

SUMMARY OF THE INVENTION

The present invention provides a universal tilt base for general-purpose router motors, that is, for routers not intended for specific uses such as laminate trimming. Such general-purpose router motors are typicallv contained in cylindrical housings having diameters of 3½ inches and greater. The invention includes a cylindrical collar preferably configured to receive one of a variety of such general-purpose router motors supplied by various manufacturers. The collar is tiltingly attached to the upper surface of a provided table base having an aperture, so that when a cutting bit attached to the router motor, the bit protrudes through the aperture to effect a workpiece. Means are provided by the invention to adjust both the depth and tilt angle of the cutting bit with respect to the workpiece.

In terms of depth adjustment, although the collar may be dedicated to a particular motor housing from a particular manufacturer, in the preferred embodiment the collar is configured to accommodate router motor housings which either slide, without rotation, to adjust cutting depth and those which may be rotated during depth adjustment. Thus, to accommodate at least two of the types which do not rotate during depth adjustment, the collar is configured to receive motor housings having an at least one outward protrusion. Also in the preferred embodiment, a plurality of grooves are formed lengthwise and spaced apart on the inside cylindrical wall of the collar to accommodate motor housings having a plurality of spaced apart outward protrusions which slidably engage with the grooves, and the collar is further separated lengthwise to accommodate motor housings having a single outward protrusion. Means are also provided in this embodiment to compress the separation in the collar to secure the motor housing in position with a cutting bit attached thereto so as to bring about a desired cutting depth in the workpiece.

The inventive tilt base may optionally include means to adjust the lateral positioning of the bit with respect to the workpiece to regulate horizontal depth. One embodiment includes a pair of guide arms parallel to each other and to the axis of the collar, each guide arm having a first end secured to the side of the collar and a second end which extends past the bottom surface of the base, the first ends being attached to the collar through extensions which enable the guide arms to clear the table base on either side so as not to inhibit the pivoting action of the collar, the second end of each guide arm including an adjustable stand-off perpendicular to its respective guide arm, enabling the stand-off to ride against a surface of the workpiece other than that slidably engaged with the bottom surface of the tilt base so as to promote accurate lateral bit positioning and, hence, horizontal depth. In place of the guide arm assembly, two types of inventive depth guides are also disclosed, including a first type for use against a substantially planar workpiece, and a second type having adjustable rollers, for convenient use against a workpiece having an external or internal curved surface. In an alternative embodiment of the invention, the collar which supports the router motor housing, may be lifted out and removed from the tilt base, and used independently of the base with the guide arms and a guide adjustably fastened to the side of the collar to set vertical depth.

Thus, a preferred tilt base which accommodates full-size router motors from various manufacturers, comprises a table base in the form of a plate having a length, a width, and parallel upper and lower surfaces, the bottom surface being adapted for sliding engagement with a workpiece, the upper surface including means to securably receive at least one handle for operator use. A pair of pivot plates connected to opposing sides of the upper surface and extending perpendicularly therefrom support a cylindrical collar with a central axis and a length parallel to the axis for pivotal rotation in a plane parallel to the length of the base and perpendicular to the surfaces of the table base. Means associated with the collar enable the collar to securably receive full-size router motors available from various manufacturers, and means associated with the collar and at least one of the pivot plates secure the collar in a particular desired orientation for use. To accept disparate router motor models, the inner cylindrical wall of the collar features a plurality of grooves formed lengthwise and spaced apart on the inside cylindrical wall of the collar to accommodate motor housings with a matching set of dimples extending outwardly from the motor housing. In the preferred embodiment six such grooves are provided. In addition, the collar features a lengthwise separation to accommodate those motor housings having a single, larger outward protrusion, and at least one set of clamping tabs and associated fasteners are provided to compress the separation in the collar to secure the motor housing in position.

DETAILED DESCRIPTION OF THE INVENTION

Figure 1:
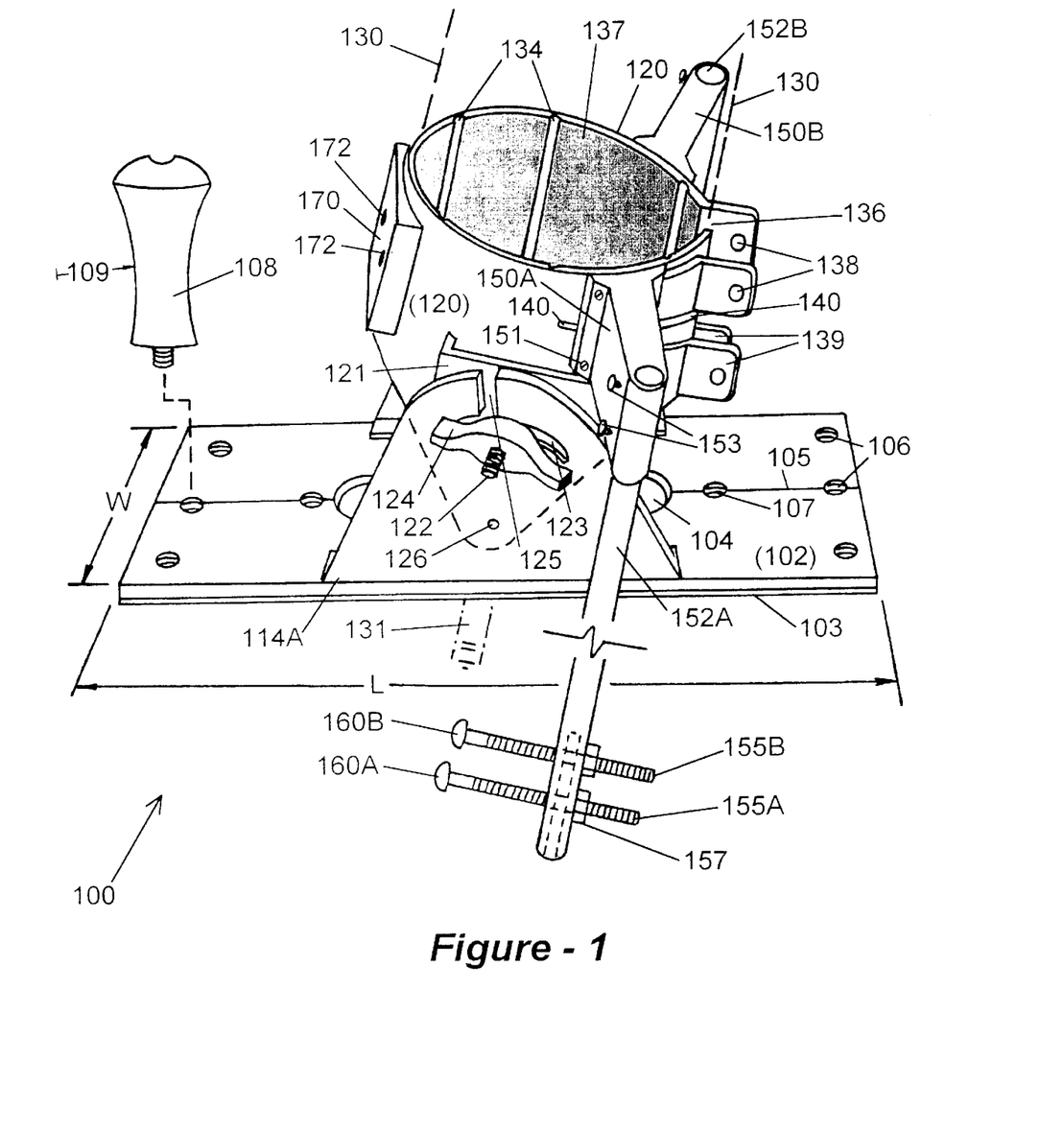
FIG. 1 is an oblique representation of a full-size router tilt base including optional guide arms.

FIG. 1 illustrates a preferred embodiment of the invention generally at 100. A table base 102, or "base" as it may be referred to herein, consists of a flat metal plate, preferably aluminum, though other materials such as steel and various alloys may alternatively be used. In the preferred embodiment, this plate is not solid, but instead utilizes a honeycomb casting with reinforcements in those areas subjected to greatest stress, for example, in and around the handle attachment points 106, and so forth. Additionally, a glide plate 103 is preferably securably affixed to the bottom surface of the base, the plate 103 being of a plastic such as plexiglass or other polymeric or dimensionally stable material which promotes easy sliding against a workpiece. The base 102 defines a length dimension L and a width dimension W, either one of which may be larger than the other, but in the preferred configuration, L exceeds W, as shown.

A central aperture 104 is formed through the base 102, preferably as a lengthwise slot to ensure that bit 131 attached to a motor in housing 130 depicted with broken lines does not make contact to the base 102 when tilted during use. The base 102 additionally preferably includes one or more threaded holes 106 to which one or more handles 108 may be removably secured, to meet the holding preferences of various users, including right- and left-handed operators. Threaded holes 107 are formed to accept shop-made guide or "swing" arms, as they are called, enabling one or more such arms to be attached to the underside of the base and secured to a pivot point, enabling the base and router with cutter bit attached to be used along large radii in accordance with the length of the guide or swing arm used. Additionally, a longitudinal score mark 105 is preferably produced on the upper surface of the base 102 precisely through the center line of the base, as shown, for alignment purposes during use.

On either side of the base 102 there is attached a pair of opposing pivot plates 114a and 114b, having bent tabs 115a and 115b forming rigid, upright, spaced-apart members perpendicular to the plane of base 102 when fastened in place. These pivot plates 114a and 114b may either be permanently adhered to the upper surface of the base 102 through the welding of the bent tabs 115a and 115b or, alternatively, the pivot plates may be removably secured to the upper surface of base 102 through the use of a plurality of fasteners, using, for example, screws with recessed heads (not shown).

A collar 120 is pivotably supported between these two pivot plates 114a and 114b, facilitating rotation of the collar around an axis defined by pivot points 126 (only one being shown). To provide for a more smooth pivoting action, angle plates with surfaces 121 are attached on opposing outward sides of collar 120, thus enabling sliding engagement against the inward facing surfaces associated with pivot plates 114a and 114b. Although the surfaces may be formed onto bent plates, as shown, the collar 120 may alternatively be cast in unitary fashion with solid portions protruding outwardly from either side with these outer surfaces being formed through a machining process, resulting a configuration or similar to that depicted in FIG. 6. A wing nut 124 or other suitable hand-operated fastener is included on both sides of the assembly to lockingly engage the collar 120 at a desired orientation. Loosening of the wing nut 124 enables outward threaded rod 122 to rotate within slot 123. One or more "click stops" may further optionally be provided to engage the collar at often used angles such as 0°, 45°, 22½°, 30°, did so forth.

As shown in FIG. 1, either or both of the pivot support plates 114a and/or 114b may include a split area 125, thereby enabling the wing nuts 124 to be removed on both sides, allowing the collar 120 to be lifted out by moving the threaded stud 122 through the slot 125. The collar, thus removed may then be used in independent fashion, is described in further detail below with reference to FIG. 6. To facilitate removal, the pivot pins 126 on both sides also need to be disengaged or removed. This may be accomplished by providing pivot pins more or less in set-screw form, in which case they will be removed entirely as part of the collar removal process. Alternatively, however, the pivot pins may be configured and recessed in such a manner that they unscrew for a certain portion of their length, but then dangle freely while being retained by or partially within the pivot plates, thereby enabling the collar to be removed yet minimizing loss of the pins themselves. Although slots 125 may be formed in parallel, spaced-apart fashion on both plates, preferably, to ensure against an inadvertent disengagement of the collar, slot 125 is provided on only one side of the assembly. As a further guard against inadvertent loosening, the angle of the slot 125 is preferably not aligned with a popular setting such as 90° or 45°, but instead, is associated with an odd angle, for example 80°, 50°, etc.

Although the collar 120 may be configured to accept a particular motor housing, in the preferred embodiment, the collar 120 includes various features which enable it to accommodate router motor housings 130 supplied by different manufacturers utilizing different collar engaging styles. For example, the inner wall of the cylindrical collar 120 preferably includes a plurality of grooves 124, as certain manufacturers provide motor housings with small dimples or protrusions which slide within the collar to facilitate depth adjustment. In the preferred embodiment, six such grooves 134 are provided to accommodate full-size Porter Cable routers. Additionally, in the preferred embodiment, the collar 120 includes a vertical separation 136 along its entire length to accommodate router motors having only a single protrusion, typically associated with a rack-and-pinion type of depth adjustment mechanism. Black & Decker equipment, for example make use of such an adjustment mechanism. The width of this separation 136 is such that it does not interfere with the rack on the side of such motor housings, enabling it to slide up and down for depth adjustment purposes.

Regardless of router motor housing style, means are provided to lockingly engage the full-size motor housing into the collar. In the preferred embodiment, tabs 138 and 139 are compressed with fasteners (not shown) to lock the router motor housing into position once a desired depth is realized. Although only one set of tabs would be sufficient for this purpose, two sets of tabs are preferably provided to ensure positive containment of the router motor housing in place. To ensure independent clamping action of the two sets of tabs, a transverse split 140 is also made in the collar between the two sets of tabs to minimize the effect of one set of tabs on the other during tightening. Preferably the inner wall of the collar 120 is also machine roughened or textured, as depicted by stipple marks 137. In the event the collar is cast, this surface roughening may be provided by simply avoiding to polish the inner cylindrical wall of the collar. As an alternative to the tabs 138 and 139 and associated compression-type fasteners (not shown), ski-boot style hinge wire capturing type of buckles may alternatively be used, which would facilitate a more straightforward securement and eliminate unattached components which might be lost.

Figure 2:
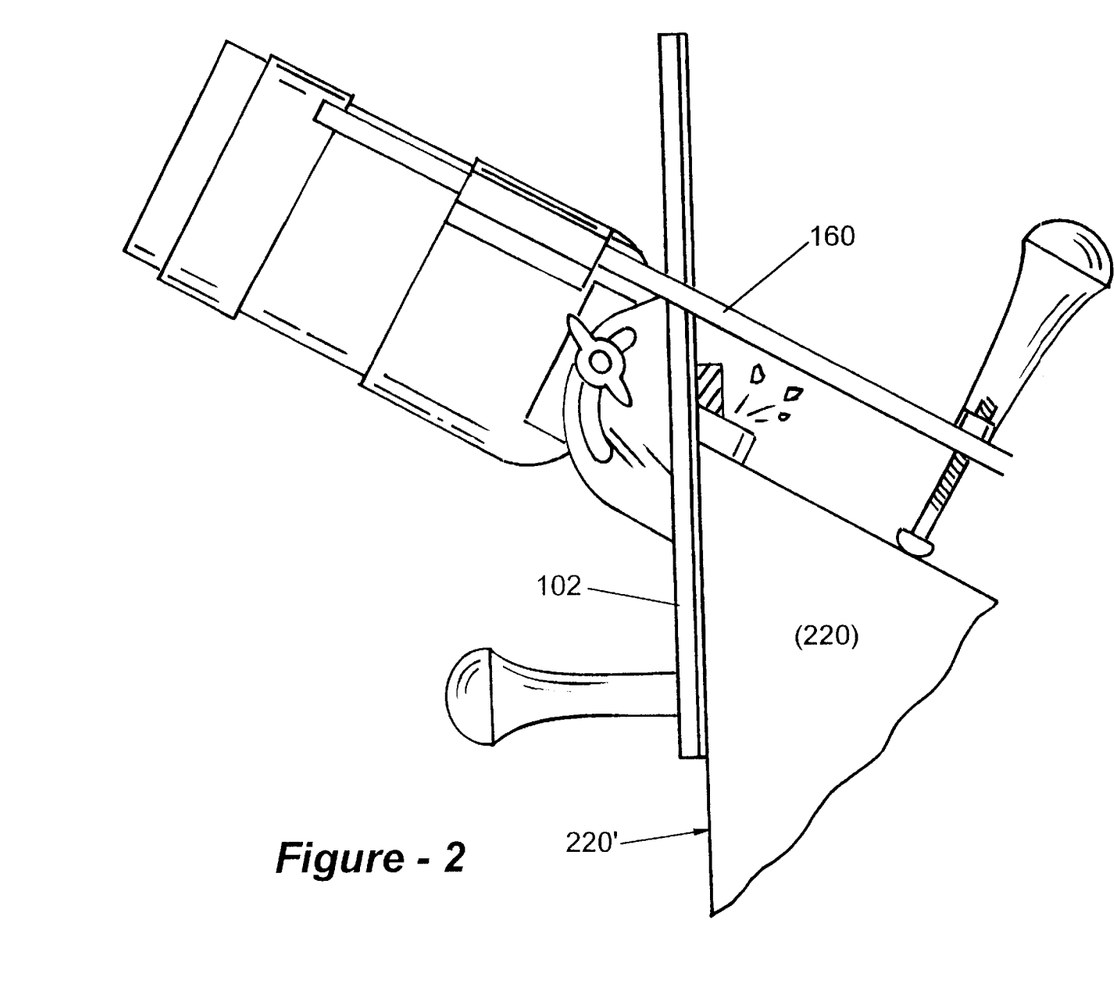
FIG. 2 is a side-view schematic representation of the router of FIG. 1 in use.
Figure 6:
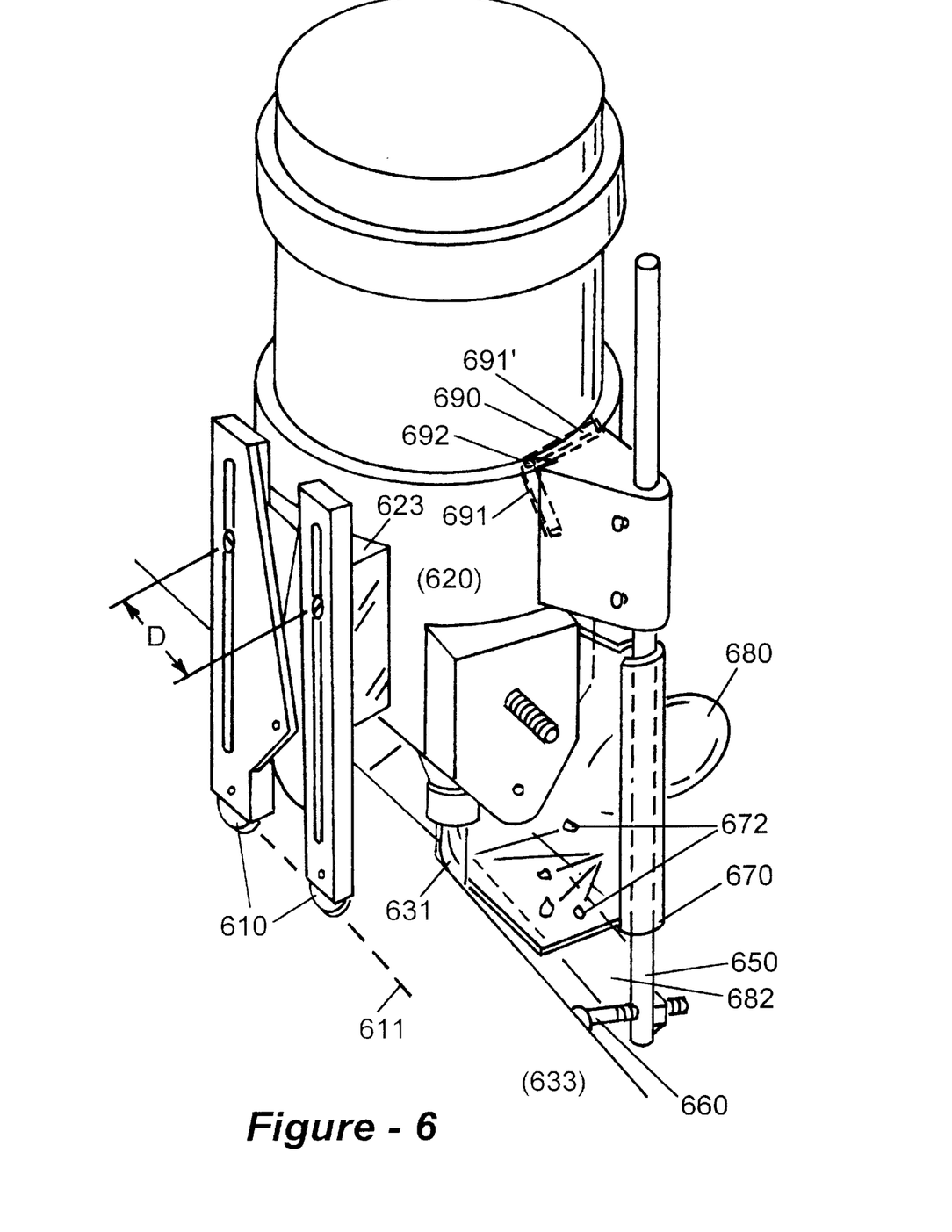
FIG. 6 is an oblique representation wherein the collar has been removed from the tilt base for independent use.

Continuing the reference to FIG. 1, the tilt base according to this invention preferably further includes a guide arm assembly to provide secondary contact against the workpiece to control lateral positioning of the bit with respect to the workpiece in addition to tilting of the bit and depth adjustment. This guide arm assembly includes two guide arms 152a and 152b on either side of the base 102 which are attached to the collar at one end through outward extensions 150a and 150b, having sufficient length to ensure that the arms 152a and 152b clear the outermost width dimension of the base 102 as the collar tilts. As shown, these extensions 150 are preferably removably secured to the outward walls of the collar 120 through screws 151, and the guide arms 152 are removably secured within the extensions using screws 153, facilitating an assembly which may be readily dismantled. As an alterative to the screws 151, as mentioned, a dovetail-type of arrangement may instead be used as shown in FIG. 6. The distal ends of the guide arms 152 each include a standoff 155 having a head 160 which rides against a secondary surface of the workpiece as shown in FIG. 2. Nuts 157 are provided to adjust the surfaces 160 in accordance with the type of bit used, and other factors. Also optionally attached or integrally formed with the collar is a plate 170 having threaded holes 172 to which a depth guide may be removably secured when a collar is used in independent form as further discussed with reference to FIG. 6. As an alternative to a large surface having the two holes 172, two separate surfaces, or tabs each associated with a mounting hole, or other configurations, may alternatively yet optionally be provided for this purpose.

Now turning to FIG. 2, the tilt base discussed with reference to FIG. 1, complete with optional guide arm assemblies, is shown during use. The bottom surface of the plate 102 moves slidingly with respect to a first surface of the workpiece 220, ordinarily a flat surface of the workpiece, while the guide arms with surfaces 160 ride against a secondary surface of the workpiece, thus assuring overall control of bit depth, tilt angle and lateral movement. In the preferred embodiment two surfaces are associated with the guide arm assembly, the secondary surface 220' of the workpiece may be flat or curving while maintaining control of the cutting process. In the preferred embodiment, the cylindrical shape of the collar is truncated on either side at an angle of substantially 45°, enabling the collar to tilt slightly greater than 45° in one direction, such as 47°0, and at least 30° in the other direction, for example, 35°, the shorter angular extent in one direction as compared to the other being limited by the striking of tabs 139 against the upper surface of the base 102. Although in a preferred embodiment the collar is truncated substantially at 45° to facilitate the tilting just described, it should of course be recognized that the physical configuration may be changed and adapted to facilitate a wider tilting angle, including a full 45° to either side, or even greater angles, depending upon the placement or elimination of tabs 139, the length of the aperture 104, the distance of the pivot pins 126 with respect to the upper surface of base 102, and so forth.

The tilting action provided by the present invention facilitates a number of versatile uses beyond angled cutting. For example, with the base held in a steady orientation, and with the wing nuts 124 slightly loosened to an extent which allows the collar to tilt freely relative to the base, and by further using an appropriate bit and a predetermined cut depth, the invention may advantageously be used to cut pockets of the type used in pocket joinery, indicative of style-and-rail type joints prevalent in cabinetry, furniture making, and so forth. Regardless of the application, one object of the present invention is to replace the existing standard base supplied with the router motor housing such that the standard base may never need to be used again. That is, in the preferred embodiment, the present invention provides all functions possible with the standard base but with many others described above and subsequently.

Figure 3:
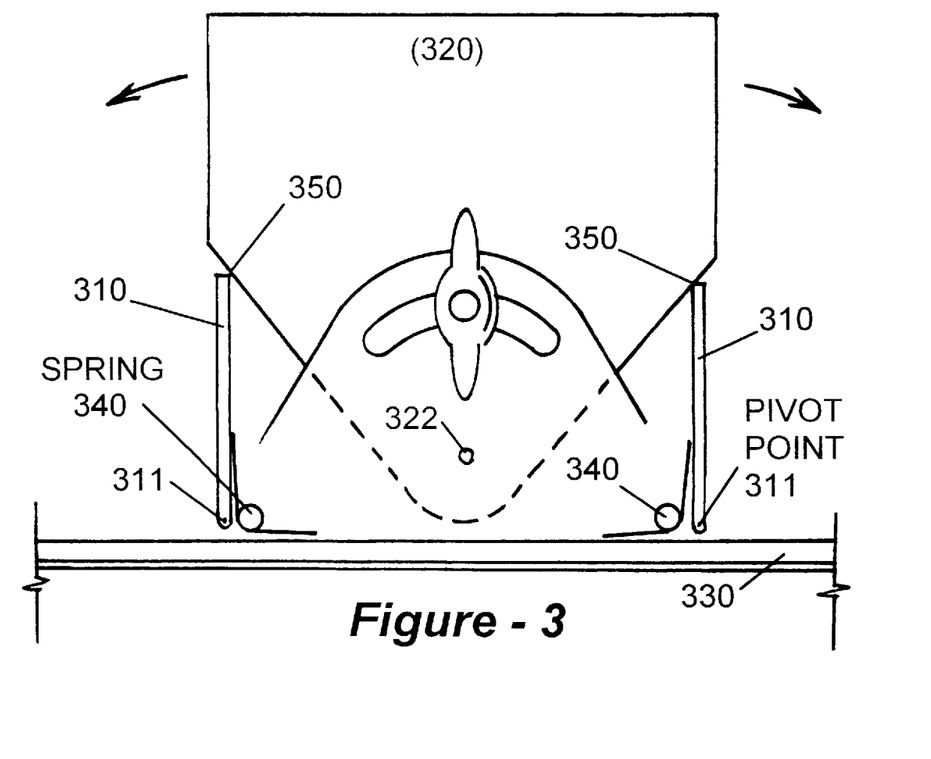
FIG. 3 is a drawing which illustrates a version of the invention including a first set of chip-deflection shields used with the tilt base.

Now making reference to FIG. 3, there is shown two optional chip deflectors 310 which may be hingedly supported forward and rearward of the collar 320 which tilts about pivot pin 322, as shown by the arrows. In the preferred embodiment, these deflectors 310 are of a clear plastic material such as Plexiglas or Lexan, and are supported for hinging engagement about pivot points 311 formed near to the top surface of the base plate 330. Springs 340 are also provided in association with each of the clear deflectors, causing them to remain urged against some portion of the collar, for example at points 350. Thus, as the collar 320 tilts from left to right as shown in the figure, the deflectors 310 remain more or less parallel and in constant contact with edges on the collar. Note in FIG. 1 that the handle 108 is curved with radius 109 to ensure that the chip deflectors 310 will clear the handles on either side enabling positioning to its maximum extent.

FIG. 4 depicts ail optional horizontal depth guide which may be used in lieu of the guide-arm assembly described above, that of FIG. 4 being a straight edge guide, depicted generally at 412. Two bolts 413 are inserted through slots 414 to fasten the edge guide to the underside of the base, having adjusted the notch 420 relative to the cutting bit 411. A step-shape lip 430 is preferably formed along one edge of the guide, thus assisting in carrying debris away from the surface 440 as it moves against and relative to a workpiece.

Figure 4:
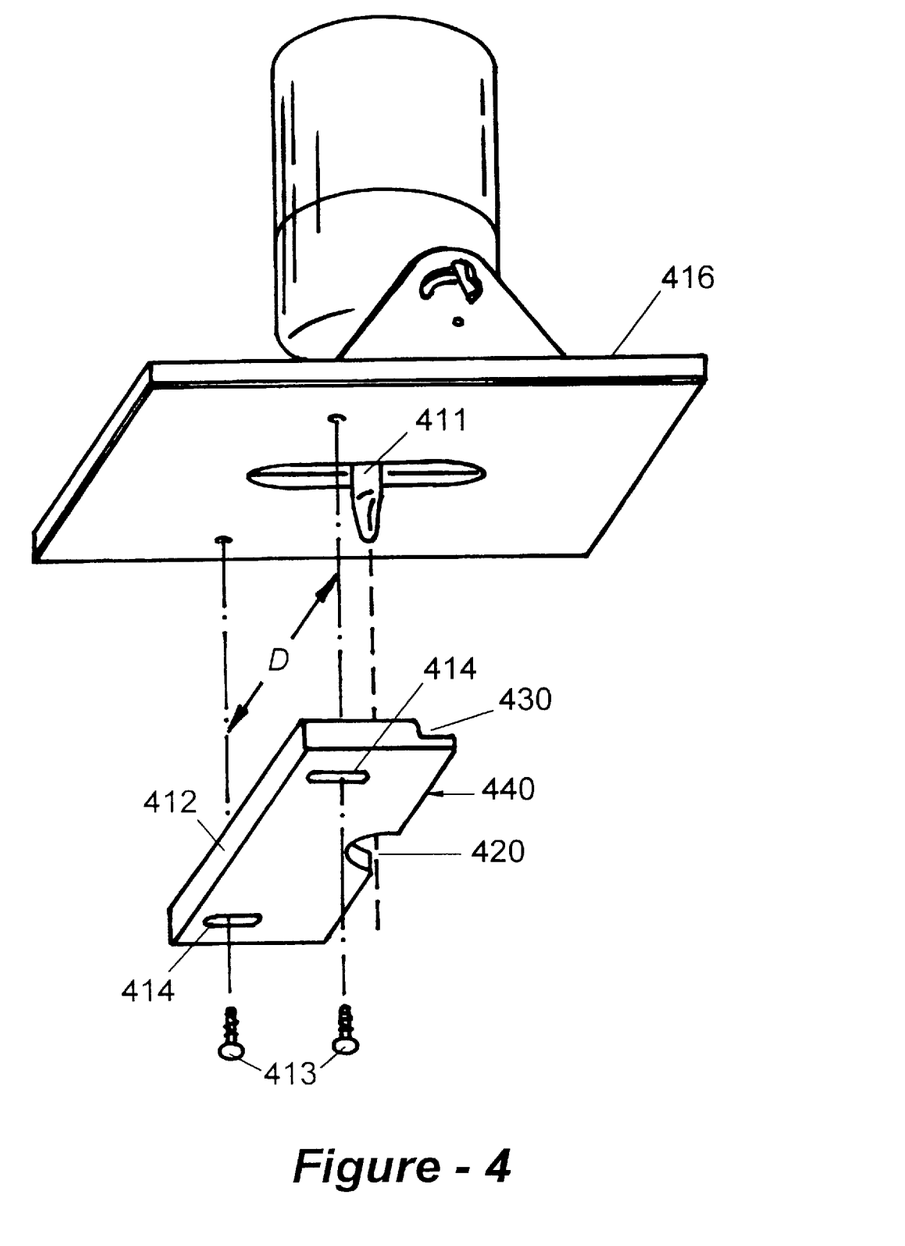
FIG. 4 illustrates an edge guide which may be attached to the full-size router tilt base to adjust horizontal depth with respect to a flat workpiece.

As FIG. 4 also illustrates the underside of the base, this drawing may also be conveniently used to show a circular recess 442, having dimensions adapted to receive a commercially available guide collar which are offered as standard accessories to all popular full size routers. Preferably, this recess 442 is adapted to accept the guide collar intended for use with Bosch manufactured routers, as this particular company also provides an adapter plate which rests in this recess 442 and further accepts guide collars of other manufacturers.

Figure 5A:
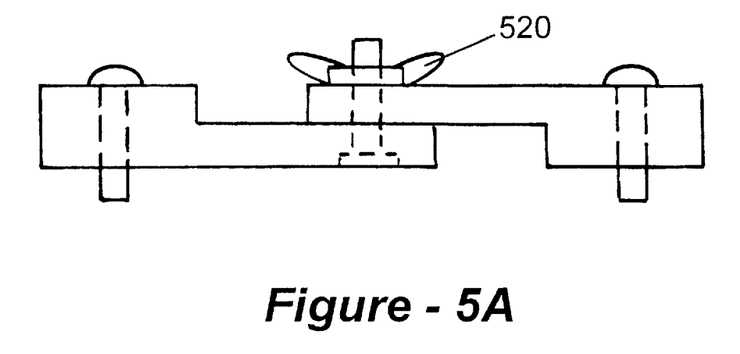
FIG. 5 depicts an alternative horizontal depth guide which may be used against a non-planar workpiece.

FIG. 5 depicts an alternative horizontal depth guide which may be mounted to the underside of the base of the full-size router tilt base to provide for lateral adjustment of the cutting bit, especially with respect to curved workpieces or work surfaces. That is, in contrast to the straight-edge guide of FIG. 4, the depth guide of FIG. 5 is particularly useful for workpieces having a non-straight edge against which the lateral adjustment mechanism must slidingly engage. As such, in place of a straight edge, two rollers 510, preferably of nylon, are rotatingly mounted to each of two guide arms which afford several degrees of freedom when mounted beneath the table base.

Figure 5B:
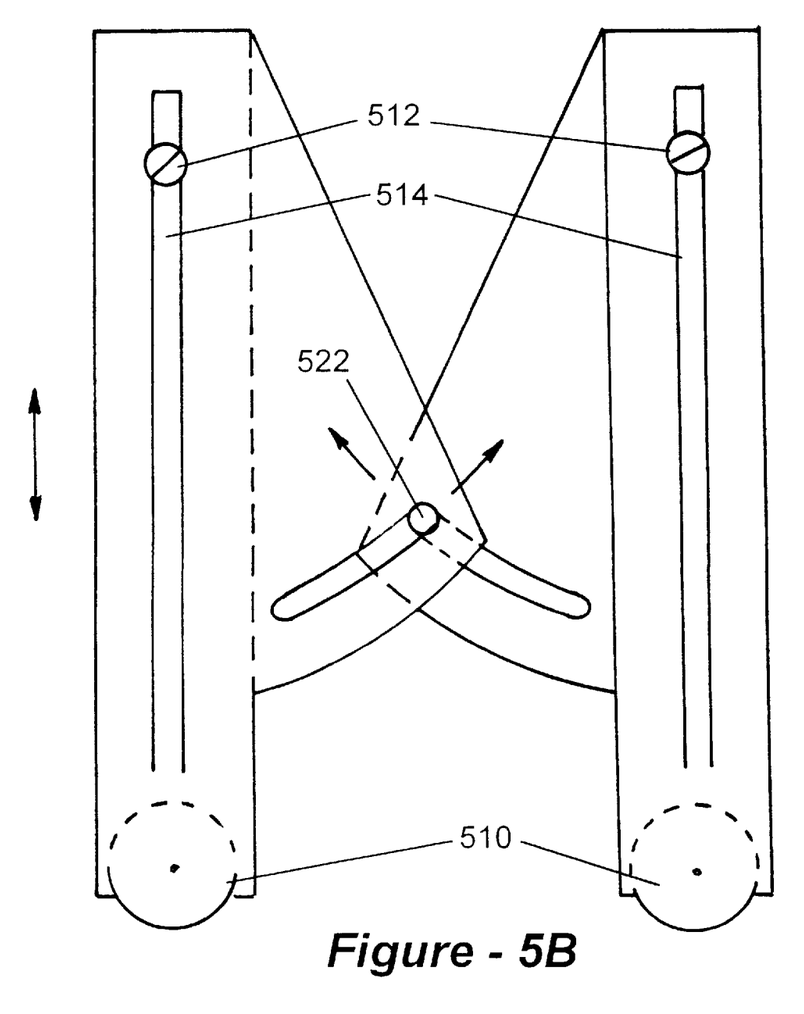

As shown in FIG. 5B, not only may direct lateral adjustment with regard to the workpiece being carried out with fasteners 512, enabling movement with the slots 514 substantially parallel to one another, a central wing nut 520 is also preferably additionally provided onto a threaded member 522 enabling an angle to be formed between the slots 514. As such, rollers 510 may be moved close together, almost touching, or apart to the extent shown in the figure, in concert with an overall lateral adjustment. In operation, the rollers 510 may be place furthest apart for curved workpiece surfaces of larger radii, but move close together for smaller radii workpiece surfaces.

FIG. 6 is an oblique drawing of an alternative embodiment of the invention wherein the collar 620 has been removed from the tilt base, and wherein the horizontal guide of FIG. 5 has been mounted to block 623 as shown, enabling the rollers 610 to ride along the path depicted by the dashed line 611 as the cutter head 631 trims the edge 632 of a workpiece 633. It should be noted that although the horizontal guide assembly of FIG. 5 may double in an ideal way for the purpose shown in FIG. 6, given a spacing D of the threaded holes in block 623 equal to the spacing on the underside of the tilt base when the guide is used for horizontal depth, an entirely separate attachment may alternatively be included for this purpose, for example, a more or less solid plate with two slots and two rollers, or entirely separate arms, each with its own slot and roller, and so forth. Additionally, although screws are shown holding the guide to the block 623, any other appropriate attachment means alternatively be utilized, including wing nuts, thumb screws, and so forth.

In the configuration depicted in FIG. 6, as rollers 610 roll along path 611, the main guide arms 650 (only one of which is clearly visible in the figure), support the adjustment stand-offs 660 against a different surface of the workpiece 633 as the cutter head 631 affects the workpiece in accordance with bit configuration and the various settings. With the "horizontal" guide in place as shown in FIG. 6, in actuality, such guides control the vertical depth of the bit along the axis of the motor shaft, as opposed to horizontal depth, since, in this configuration, the horizontal guides are perpendicular with tilt base.

FIG. 6 also illustrates the use of an optional chip deflector 670 which may be convenient when the collar is removed and used in independent fashion as shown. Preferably, this deflector 670 includes opposing incomplete cylindrical side portions which clip onto the arms 650, and a bent flap portion 671 to maximize the surface area most likely to be exposed from flying debris 672 as the cutter head 631 performs its work. As with the deflector shields of FIG. 3, this chip-deflector 670 is constructed of a clear plastic material such as Plexiglas, Lucite, or the like.

FIG. 6 also further illustrates an alternative convenient method of attaching the guide arms supports to the collar, that is, instead of separate, multiple screw fasteners, or the like, a dovetail type of assembly 690 may alternatively be used, in conjunction with some sort of locking mechanism. Preferably, the guide arm support will pressure fit into the angled sleeve as shown, with a bar 691, hinged at point 692 being movable to a second position 691', thereby holding the guide arm support in place. Various other clips and attachment mechanisms may alternatively be used in this particular embodiment. A handle 680 which attaches centrally to plate 682 used to connect the two guide arms is also evident in the figure.

Having thus described my invention, I claim:

1. A universal tilt base for a general-purpose router, comprising:

a table base having upper and lower surfaces and a longitudinal aperture formed therethrough, the upper surface including a pair a slidingly connected chip deflectors;

a collar having a cylindrical bore having a diameter of approximately 3½ inches and including structural facilities to receive one of a variety of full-size router motor housings supplied by various manufacturers, including:
   (a) those which slide without rotating to effectuate depth adjustment,
   (b) those which rotate to effectuate depth adjustment,
   (c) those having an at least one layer outward protrusion associated with rack-and-pinion depth adjustment, and
   (d) those having six smaller, spaced-apart outward protrusions, the collar being tiltingly attached to the upper surface of the table base so that when the router motor, with a cutting bit attached thereto is received by the collar, the bit protrudes through the aperture to effect a workpiece; and means to adjust both the depth and tilt angle of the cutting bit with respect to the lower surface of the table base.

2. The universal router tilt base of claim 1, wherein the means to adjust horizontal depth includes a plate mountable to the underside of the table base, the plate having a straight edge for sliding engagement with a planar work surface, and means to adjust the plate along a path perpendicular to the straight edge, thereby changing horizontal cutting depth.

3. A full-size router tilt base, comprising:

a table base having a length, a width, an upper portion and a bottom surface adapted for sliding engagement with a workpiece;

a collar having a cylindrical bore with a central axis, the diameter of the bore measuring at least 3½ inches, the length of the collar being parallel to the axis and further including features which enable it to securably receive a full-size router motor housing supplied by one of various manufacturers, such features including:
   a plurality of parallel straight grooves formed lengthwise and spaced apart on the inside cylindrical wall of the collar bore t accommodate motor housings having a plurality of spaced apart outward protrusions which slidably engage with the grooves, and
   a lengthwise separation in the collar to accommodate motor housings having a single outward protrusion, the collar being pivotably attached to the upper portion of the table base such that the axis of the collar is lockingly rotatable in a plane parallel to the length of the table base and perpendicular to the bottom surface of the base; and means to compress the separation in the collar to secure the motor housing in position with a cutting bit attached thereto so as to bring about a desired cutting depth in the workpiece.

4. The full-size router tilt base of claim 3, further comprising a guide assembly, including:

a pair of guide arms parallel to each other and to the axis of the collar, each guide arm having a first end secured to the side of the collar and a second end which extends past the bottom surface of the base, the first ends being slidably attached to the collar through extensions which enable the guide arms to clear the table base on either side so as not to inhibit the pivoting action of the collar; and the second end of each guide arm including an adjustable stand-off perpendicular to its respective guide arm which rides against a surface of the workpiece other than that slidably engaged with the bottom surface so as to promote accurate lateral bit positioning.

5. The full-size router tilt base of claim 3, the grooves being 6 in number.

6. The full-size router tilt base of claim 3, wherein the means to compress the separation in the collar includes at least one set of outwardly protruding clamping tabs.

7. The full-size router tilt base of claim 3, further including means to securably adjust the lateral positioning of the table base with respect to the workpiece.

8. A universal tilt base for a general-purpose router, comprising:

a table base having upper and lower surfaces and a longitudinal aperture formed therethrough;

a collar having a cylindrical bore configured to receive one of a variety of full-size router motor housings supplied by various manufacturers;

the collar being tiltingly attached to the upper surface of the cable base so that when the router motor, with a cutting bit attached thereto, is received by the collar, the bit protrudes through the aperture to effect a workpiece;

means to adjust the depth and tilt angle of the cutting bit with respect to the lower surface of the table base; and a pair of guide arms, each slidably attachad to an extension connected to the other surface of the collar, the extensions holding the two arms in rigid, parallel and spaced-apart relation to one another at a distance sufficient to clear to the sides of the table base as the collar tilts, each guide arm being sufficiently long to extend past the bottom of the table base, and including adjustable standoffs mounted perpendicularly with respect thereto, each standoff having a head portion adapted to slide against the workpiece.

9. The universal router tilt base of claim 8, wherein the collar with guide arms attached may be removed from the tilt base and used in independent fashion in conjunction with a vertical depth guide.

10. A universal tilt base for a general-purpose router, comprising:

a table base having upper and lower surfaces and a longitudinal aperture formed therethrough;

a collar having a cylindrical bore configured to receive one of a variety of full-size router motor housings supplied by various manufacturers;

the collar being tiltingly attached to the upper surface of the table base so that when the router motor, with a cutting bit attached thereto is received by the collar, the bit protrudes through the aperture to effect a workpiece;

the collar further including a plurality of clamping tabs stacked lengthwise on the outer surface of the housing on either side of a partial split transverse to the axis of the collar to facilitate independent tightening of each tab set; and means to adjust the depth and tilt angle of the cutting bit with respect to the lower surface of the table base.

11. A universal tilt base for a general-purpose router, comprising:

a table base having upper and lower surfaces and a longitudinal aperture formed therethrough;

a collar having a cylindrical bore configured to receive one of a variety of full-size router motor housings supplied by various manufacturers;

the collar being tiltingly attached to the upper surface of the table base so that when the router motor, with a cutting bit attached thereto, is received by the collar, the bit protrudes through the aperture to effect a workpiece;

means to adjust the depth and tilt angle of the cutting bit with respect to the lower surface of the table base; and a scissor-like assembly mountable to the underside of the table base including two rollers which rotatably engage against a workpiece, including a workpiece having non-planar surfaces, the rollers being adjustable with respect to the cutting bit to change horizontal cutting depth.

* * * * *

UNITED STATES PATENT AND TRADEMARK OFFICE
CERTIFICATE OF CORRECTION

PATENT NO.  : 5,772,368
DATED       : June 30, 1998
INVENTOR(S) : Posh

It is certified that error appears in the above-indentified patent and that said Letters Patent is hereby corrected as shown below:

Column 1, line 29: Replace "it" with --if--.

Column 4, line 21: Replace "did" with --and--.

Column 5, line 67: Replace "47°0" with --47°--.

Column 6, line 46: Replace "ail" with --an--.

Column 7, line 52: Replace "with tilt" with --with respect to their orientation when used on the bottom of the tilt--.

Column 8, line 15: Replace "a" (second occurrence) with --of--.

Column 8, line 56: Replace "t" with --to--.

Signed and Sealed this

Twentieth Day of March, 2001

Attest:

NICHOLAS P. GODICI

Attesting Officer

Acting Director of the United States Patent and Trademark Office